US005727206A

United States Patent [19]
Fish et al.

[11] Patent Number: 5,727,206
[45] Date of Patent: Mar. 10, 1998

[54] ON-LINE FILE SYSTEM CORRECTION WITHIN A CLUSTERED PROCESSING SYSTEM

[75] Inventors: Robert W. Fish, W. Chicago; Lawrence J. Schroeder, Wheaton, both of Ill.

[73] Assignee: NCR Corporation, Dayton, Ohio

[21] Appl. No.: 690,704

[22] Filed: Jul. 31, 1996

[51] Int. Cl.$^6$ .................................................. G06F 17/00
[52] U.S. Cl. ............................... 395/618; 395/182.03
[58] Field of Search .......................... 395/601, 618, 395/617, 180, 181, 182.06, 182.03, 182.13, 726

[56] References Cited

U.S. PATENT DOCUMENTS

| | | | |
|---|---|---|---|
| 5,151,988 | 9/1992 | Yamagishi | 395/608 |
| 5,175,852 | 12/1992 | Johnson et al. | 395/608 |
| 5,202,971 | 4/1993 | Henson et al. | 395/608 |
| 5,218,695 | 6/1993 | Novelk et al. | 395/621 |
| 5,293,618 | 3/1994 | Tandai et al. | 395/457 |
| 5,301,290 | 4/1994 | Tetzlaff et al. | 395/469 |
| 5,317,749 | 5/1994 | Dahlen | 395/726 |
| 5,339,427 | 8/1994 | Elko et al. | 395/673 |
| 5,371,885 | 12/1994 | Letwin | 395/621 |
| 5,394,551 | 2/1995 | Holt et al. | 395/726 |
| 5,423,044 | 6/1995 | Sutton et al. | 395/726 |
| 5,463,772 | 10/1995 | Thompson et al. | 395/612 |
| 5,504,883 | 4/1996 | Coverston et al. | 395/618 |
| 5,564,011 | 10/1996 | Yammine et al. | 395/182.13 |
| 5,612,865 | 3/1997 | Dasgupta | 364/184 |
| 5,623,651 | 4/1997 | Jernigan, IV | 395/616 |

OTHER PUBLICATIONS

Mark Aldred et al., "A Distributed Lock Manager on Fault Tolerant MPP," Proceedings of the 28th Annual Hawaii International Conference on System Sciences, IEEE 1995, pp. 134–136 No month.

Werner Zurcher, "The State of Clustered Systems," UNIX Review, vol. 13, No. 9, Aug. 1995, pp.47–51.

Shinjj Sumimoto, "Design and Evaluation of Fault–Tolerant Shared File System for Cluster Systems," 1996 Int'l Symposium on Fault–Tolerant Computing (FTCS 26), 1996, pp. 74–83 No month.

*Primary Examiner*—Paul V. Kulik
*Attorney, Agent, or Firm*—James M. Stover

[57] ABSTRACT

A method for identifying and repairing file system damage following the failure of a processing node within a clustered UNIX file system including a plurality of processing nodes, an interconnection network connecting the processing nodes, and a data storage device connected via a shared interconnect with each one of the plurality of processing nodes. The method includes the step of maintaining a journal for each processing node, each journal containing a bit map identifying inodes to which its associated processing node has acquired and retains an exclusive right. Each bit map journal is updated whenever its associated processing node acquires an exclusive right to an inode. Following a failure of a processing node, a non-failed processing node is designated to audit the inodes associated with the failed node. Auditing is accomplished by reading the bit map journal associated with the failed processing node and obtaining the exclusive right to every inode found within the journal. The inodes within the bit map journal, referred to as suspect inodes, are then compared with a global bit map which identifies each and every unit of space within the file system that is assignable. A suspect node is identified as having a transient state when the unit of space assigned to the suspect inode is also found to be assignable. The assignment of a unit of file system space to any suspect inode identified as having a transient state is thereafter discarded.

6 Claims, 2 Drawing Sheets

ON-LINE FILE SYSTEM CORRECTION WITHIN A CLUSTERED PROCESSING SYSTEM

The present invention relates to a file system for managing data storage and retrieval in a clustered processing system and, more particularly, to a process for repairing the file system following a file system component failure.

BACKGROUND OF THE INVENTION

One of the major problems associated with any file system is determining what needs to occur following a processing node failure. Such failure can result in interim states being left in the file system that were intended to be transient in nature. Such states can result in subsequent processor node failures or file system damage. This problem typically arises when it is necessary to write multiple pieces of the file system in order to complete an activity. While one piece has been written and another piece has yet to be written a transient state exists. The basic knowledge that the such transient states exist is lost when the processing node failed, thus during subsequent access the transient states are no longer recognized correctly as transient, but rather as permanent states.

In order to prevent a transient state becoming permanent and thus causing further failure, a file system is marked as "corrupted" when it is initially accessed (also referred to as "mount time") and is left marked this way unless normal shutdown of access occurs (unmount). Further, when a file system is mounted the successful completion of this activity can not occur if the file system is already marked as corrupted. This mechanism operates to prevent invalid transient states from causing further problems. This does not, however, allow the user to access the user data. A repair program, traditionally called "fsck", must be executed to repair the file system. The fsck program anticipates that invalid old transient states exist, audits all relevant data structures, and corrects any data structures found to contain invalid states. Upon completion the repair program marks the file system as clean, i.e., no longer corrupted. At this point the file system can again be safely mounted and user access can proceed.

A cluster file system, such as that described in U.S. patent application Ser. No. 08/690,703, filed concurrently with the present application, now allowed, is a product that allows multiple nodes of a loosely coupled cluster of processing nodes to simultaneously access the same file system data store which exists on a shared data storage device. Access is direct. No one node is the designated file system server, rather each node views the file system as essentially a locally accessible resource. U.S. patent application Ser. No. 08/690,703, entitled "File System for a Clustered Processing System," by Robert W. Fish and Lawrence J. Schroeder, now allowed is assigned to NCR Corporation.

The same node failure problem described above also exists within a cluster file system. However, the traditional failure recovery strategy fails because it assumes no user is capable of accessing the file system until the correction program has run to completion. This is not true in a cluster file system. The failure of any one processing node can leave transient states that can harm the remaining processing nodes, yet there exists an ongoing user community on those remaining nodes that are still accessing the file system. All further activity on the file system must be interrupted on all of the remaining nodes so that file system correction can occur. At the same time the preferable file system correction design would not unduly interfere with existing users.

OBJECTS OF THE INVENTION

It is therefore an object of the present invention to provide a new and useful process for repairing file system damage following a processing node failure within a clustered file system.

It is another object of the present invention to provide a method for identifying transient states existing within a clustered file system following a processing node failure.

It is yet another object of the present invention to provide a new and useful process for identifying and repairing file system damage following a processing node failure within a clustered UNIX file system.

SUMMARY OF THE INVENTION

There is provided, in accordance with the present invention, a method for repairing file system damage following the failure of a processing node within a clustered UNIX file system, the clustered file system including a plurality of processing nodes, an interconnection network connecting the processing nodes, and a data storage device connected via a shared interconnect with each one of the plurality of processing nodes.

The method of the present invention includes the step of maintaining a journal for each processing node, each journal containing a bit map identifying inodes (files) to which its associated processing node has acquired and retains an exclusive right. Each bit map journal is updated whenever its associated processing node acquires an exclusive right to an inode. Following a failure of a processing node, a non-failed processing node is designated to audit the inodes associated with the failed node. Auditing is accomplished by reading the bit map journal associated with the failed processing node and obtaining the exclusive right to every inode found within the journal. The inodes within the bit map journal, referred to as suspect inodes, are then compared with a global bit map which identifies each and every unit of space within the file system that is assignable. A suspect node is identified as having a transient state when the unit of space assigned to the suspect inode is found to be assignable. The assignment of a unit of file system space to any suspect inode identified as having a transient state is thereafter discarded.

One other special check is made to identify inodes having transient states. All suspect inodes are cross checked against the remaining suspect inodes identified in the bit map journal associated with the failed processing node to make certain that the same space is not assigned to more than one inode. This check needs only to occur against the other suspect inodes because only on the failed node could sufficient rights exist for this to occur.

The above and other objects, features, and advantages of the present invention will become apparent from the following description and the attached drawings.

DETAILED DESCRIPTION OF THE PREFERRED EMBODIMENT

1. Overview

Figure 1:
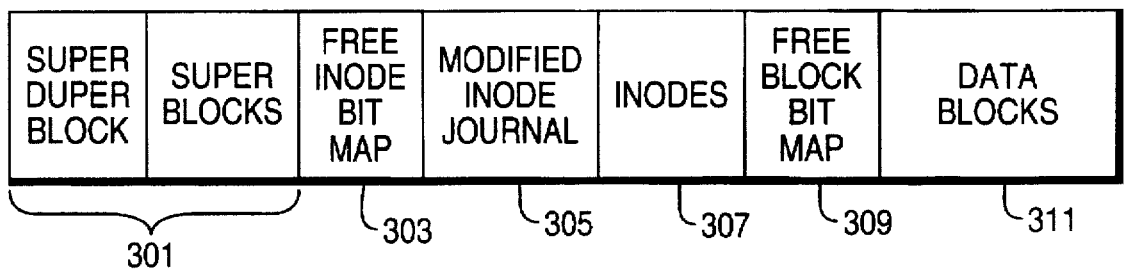
FIG. 1 is a block diagram of a file system layout for a cluster file system (CFS).

A user accessible "file" within a file system represents a grouping of space within that file system that contains data that is logically associated in some way defined by the user. Within a UNIX system, this grouping of space is managed by a data structure referred to as an inode. An inode is a data structure known to the internal file system portion of the operating system which defines the space being reserved by the file system for a file. This is the file system unit that is most likely to contain transient state data following a processing node failure, which could cause file system damage during subsequent accesses. Such transient data would make it appear that space reserved for a file was assigned, when in fact no such assignment had been made. The major effect of such an error would be to have multiple inodes apparently reserving the same space.

In order to check for and correct such a problem while users on the remaining processing nodes continue to access the file system, the inodes which were potentially being changed on the failing node just prior to the failure need to be identified and isolated from the rest of the processing nodes until an audit can be made to determine their validity. This process allows the users of those portions of the file system which are unaffected by the node failure to continue unabated.

The method presented herein for correcting file system damage utilizes the fact that in order to cause a transient state to exist in an inode, a processing node must first acquire an exclusive right to access the inode. The acquisition of an exclusive right implies that no other node in the cluster has the right to either read or write the inode, without also acquiring the right before doing so. For another node to acquire any right to the inode the present holder of the exclusive right must relinquish that right. This occurs normally when the holder of the exclusive right has completed its task, which further implies that no transient state within the inode can exist. The holder of the exclusive right relinquishes its right abnormally if the node fails. However, when such an activity occurs the mode of transition is well known. Thus, the new holder of the right will be able to determine that the former holder of the right failed. This allows the new holder to freeze access to the inode until it can be audited.

There still exists the problem of basic identification, however. If no other processing node is currently attempting to access an inode that has become suspect, then no abnormal right transition occurs, and no correction can take place. In order to identify all suspect inodes, the file system is designed to contain a bit map, hereinafter referred to as a journal, for each processing node. Each such bit map is sparsely populated with bits that represent all of the inodes to which the associated node has acquired and retains an exclusive right. In fact, this update of the disk copy of this bit map must be done as part of the acquisition of the exclusive right. This procedure guarantees that, should a processing node fail, an up-to-date record of all inodes which may contain transient states by that processing node have been recorded in a manner that allows another processing node to totally identify them.

Once a failure occurs, the failure is noted on all of the remaining nodes, and any rights in transit as a result of the failure are frozen. One of the remaining nodes is designated to audit the suspect inodes and correct any detected file system damage. The first step in the process is for the designated node to initiate a special correction program, hereinafter referred to as "online-fsck". This program also has the ability to acquire rights to inodes as though it were a processing node. The online-fsck program reads the sparsely populated bit map journal associated with the failed node and acquires the exclusive right to every inode found within the bit map. This procedure may require other processing nodes to relinquish frozen rights. If this situation becomes necessary the processing node will relinquish its rights to suspect inodes and immediately attempt to re-acquire such rights.

The online-fsck program can then proceed to audit each suspect inode by reading it, and then comparing it to a global bit map used by the file system to identify each and every unit of space that is assignable. If the online-fsck program finds that a unit of space is both in an inode and is assignable then the inode is deemed to have a transient state and all of the space as assigned in the inode is discarded. One other special check is made: all suspect inodes must be cross checked against the rest of the suspect inodes to make certain that the same space is not assigned twice. This check needs only to occur against the other suspect inodes because only on the failed node could sufficient rights exist for this to occur.

Upon completion of the audit of a suspect inode, the exclusive right to the suspect node is relinquished by the online-fsck program, allowing the right to transition normally to another processing node. If an inode had been found to contain damaged information, and had its space assignment cleared, an ongoing user program could be caused to malfunction.

If a node is currently executing online-fsck and the node fails, another node will automatically be designated to run the online-fsck process twice, once for the original failed node and again for the newly failed node. Recovery from N−1 failures are supported where N is the original number of nodes.

Note that this design minimizes the amount of time any user is blocked from accessing files within the file system, and localizes such blockage to only exist against the small portion of the file system which could have been damaged by a node failure.

2. CFS Layout

The unique aspect of the CFS product is that multiple UNIX systems will be capable of performing file system actions on a single disk image of the file system. Each individual UNIX system will possess an in-core image of some of the file system structures. These images must be coordinated to ensure that multiple systems do not conflict over contents of the file system or destroy file integrity. The means for this coordination is through DLM locks and file system data structures which permit multiple systems to modify exclusive portions of the shared disk file system simultaneously. This section describes the file system data structures and layout.

Fundamental in the cluster file system layout is the use of inodes and data blocks with similarities to many UNIX file systems. In order to provide the maximum capability for parallelism in the cluster, the layout contains several data structures which are generally exclusive to each individual system within the cluster, specifically individual superblocks and modified inode journals.

In conventional UNIX file systems, data structures such as inodes are usually stored with multiple instances in a single disk block. In a cluster file system such an arrangement would complicate and impede the performance for multiple nodes performing actions on different files whose data structures were all in a single disk block; therefore each inode is segregated and maintained in individual blocks.

The overall cluster file system layout is shown in FIG. 1. Logical block size in the Cluster File System is 2048 (2K) bytes. Unlike most other UNIX file systems, the Cluster file system does not contain a boot block; the superblock structures start at the beginning of the disk device, i.e. logical and physical block 0. No boot block is needed as there is no possibility or intent that UNIX system root file systems exist on a cluster file system.

The cluster file system layout includes the following elements:

Superblocks 301

Superblocks contain the high level information about the file system and its status. The cluster file system will have at least as many superblocks as the maximum expected number of UNIX systems in the cluster. The actual number of superblocks created for a given CFS file system will be determined at the time the file system is created ("mkfs"). Each superblock contains a number of values which define the size and makeup of the superblock structure. A set of these values is determined at the time the file system is created and contained within a structure within each superblock called a "superduperblock". The parameters contained within the superblocks are the same in all superblocks, i.e., total number blocks, inodes, logical block offsets to parts of the file system layout. Other element values in each superblock will be distinct between different superblocks; such as free inode and block arrays.

Each cluster UNIX system will utilize a distinct superblock determined at mount time, either by an explicit parameter to mount or by the mount command itself through attempts to gain an exclusive DLM lock on potential superblock resources. No two cluster systems will ever mount using the same superblock, this event being prevented through the acquisition of superblock DLM locks at an exclusive level.

Each cluster UNIX system will hold an in-core image of its superblock and operate against it. The superblock on disk is used for storing the values when the individual system unmounts from accessing the filesystem. The disk superblock will also indicate the state of the superblock and its view of the filesystem (s_state). This state will indicate the following conditions:

FsOKAY the superblock information was correct the last time this superblock for the filesystem was unmounted.

FsACTIVE the superblock is or was in use. If the mount finds the superblock indicating active state then a fsck will be necessary prior to mounting since the last system to have changed the filesystem via this superblock must not have unmounted it.

FsBAD The last unmount of the filesystem using this superblock had indications that some corruption existed.

Within each superblock are lists of free inodes and blocks; these are kept unique for each superblock.

The free inode list (s_inode) contains CFSNICINOD free inode numbers. CFSNICINOD will be 50. When a system finds that its own free inode list is empty and it needs to allocate an inode, then it must collect up more free inodes into its own free inode list from the common shared image of free inodes on the disk in the free inode bit map. The coordination of this shared pool of free inodes is through the free inode DLM lock resource.

The free block list (s_free) contains CFSNICFREE free block logical addresses. CFSNICFREE will be the maximum value possible to fill out the superblock size to the logical block size (2048 bytes). [several hundred free blocks] When a system finds that its own free block list is empty and it needs to allocate a block, then it must collect up more free blocks into its own free block list from the common shared image of free blocks on the disk in the free block bit map. The coordination of this shared pool of free blocks is through the free block DLM lock resource.

Free Inode Bit Map 303

This area of the filesystem layout contains a bit map where a distinct "bit" represents each inode in the filesystem. The purpose of the bitmap is to re-supply free inodes to an individual superblock when an active system exhausts its own "individual" inode free list. Within the bitmap a inode bit will be one (1) if that inode is "free" and has not been placed on any superblock's free inode list; it will be zero otherwise.

The use and manipulation of the free inode bit map is coordinated through several DLM lock resources:

free inode resource free inode bitmap resource

Using the resource locks the bitmap would be scanned by a system needing free inodes and marked free inodes would be collected into its own free inode list and the corresponding bit "flipped" to zero. In the case where a system would exceed the bounds of its free inode array and it has to free another inode; then the bitmap would be modified to indicate the respective inodes are "free" (set to 1) after removing the inode from its own free list.

This use of the bitmap eliminates the need to scan through the inodes themselves to find free ones; improving performance by having less contention and disk I/O during inode allocations.

To additionally assist in reducing contention for the same portion of the inode bitmap, the value from the free inode resource lock will indicate which portion of the free inode bit map to use next. Refer to the DLM free inode resource section for more detail.

The online recovery mechanism will not be responsible for auditing and restoring lost free inodes to the bitmap. The off-line full fsck facility will return all free inodes to the free inode bitmap and thus handle correcting the filesystem for lost free inodes.

The size of the free inode bit map will be determined by the number of inodes in the file system (controlled by parameters to mkfs, the program utilized to construct original file systems).

The number of logical blocks used for the bit map is the rounded up value of:(#_of_inodes)/(size_of_logical_block_in_bytes*8)

Modified Inode Journals 305

The Modified Inode Journal contains a separate inode bit map for each superblock. An individual Modified Inode Journal bitmap will provide indication to the on-line recovery function that particular inodes may have been modified by a processing node prior to a system failure of that processing node (and thus may be damaged). A bit representing a specific inode is set (=1) whenever an in-core inode is created and an exclusive inode lock is acquired prior to any modification. The bit is cleared whenever an inode lock is closed (and the bit had previously been set).

The size of the Modified Inode Journal is determined by the number of superblocks (max # of cluster nodes possible) and the number of inodes in a particular filesystem. Every CFS system at the time of mounting a cluster file system utilizes a unique superblock, and also will use the respective unique Modified Inode Journal bitmap.

The use of this journal eliminates the need to scan all inode blocks during online recovery thus improving online recovery performance.

To reduce the amount of disk writes for a given Modified Inode Journal, writes of the incore image to disk need only be performed when a modified inode bit is set which was previously not set (zero). This means that for most file activity which modifies a inode and its data blocks (thereby requiring exclusive inode lock at times) the respective write to disk of the incore modified inode bitmap block would only occur once for as long as the file remains open in the system. It is not necessary to write the incore image of the modified inode bitmap block when a bit is reset; at some point due to other activity in the system the image may get written.

Inodes 307

An inode is the data structure which contains most of the definition of a particular file or directory in the file system. Each inode in the filesystem is within a distinct logical disk block of size 2048 bytes. The inode data structure itself takes up only a portion of the logical block; therefore part of the remaining block can be used for actual data. At present the design utilizes 1024 bytes of data. Note that in most conventional UNIX file systems, structures like an inode might be grouped together with multiple inodes residing in the same disk block, however such an implementation for CFS would likely result in the possibility of higher inter-node lock contention and is therefore avoided.

Inodes structures stored on disk differ somewhat from the incore Inode structure. The disk inode contains a subset of the incore information.

Access to an inode or its respective data blocks is coordinated through the use of DLM lock resources.

One negative effect of having inodes being segregated into individual data blocks with the requirement for acquisition of a DLM resource lock for each inode is that some inode intensive operations will be degraded. A prime example of this is the UNIX "ls–l" command which must access all inodes in a directory. Care should be taken in the application of uses for the Cluster File System to avoid such operations when possible to maintain the best performance.

The inode data structure array element di_addr contains CFSNADDR (32) addresses. Each address points to other data or indirect arrays of addresses depending upon which entry in the array is specified. The last 3 addresses within di_addr are indirect addresses of blocks; whereas the remainder are direct block addresses. Of the indirect block addresses, they are respectively for single, double, and triple level indirection. Given that in the CFS layout, space within the logical block which contains the inode is "available" due to the segregation of inodes to distinct disk blocks:

the size of the disk block array is somewhat increased over that found in file systems such as UNIX S5 disk version of the inode contains actual disk block addresses as opposed to compressed encoded versions of the addresses.

This extra space consumption can provide some positive tradeoff in performance by the increased likelihood of direct data block addressing (larger array) and less time to compute the actual disk address (eliminating the compressed encoded address)

The use of the remaining portion of the inode logical block for file data will also improve the filesystem is two areas:

Quick access to small files (or potentially the last small part of files which fit the remainder of data in the inode logical block)

High filesystem integrity to very small files; since any changes to the file content and the file inode could occur within the same disk I/O action.

Free Block Bit Map 309

This area of the filesystem layout contains a bit map where a distinct "bit" represents each logical disk block in the filesystem. The purpose of the bitmap is to re-supply free disk blocks to an individual superblock when an active system exhausts its own "individual" free block list. Within the bitmap a disk block bit will be one (1) if that disk block has not been allocated anywhere in the filesystem and has not been placed on any superblock's free disk block list and will be zero (0) otherwise.

The use and manipulation of the free disk block bit map is coordinated through several DLM lock resources:

free disk block resource free disk block bitmap resource release free blocks resource Using the resource locks the bitmap would be scanned by a system needing free disk blocks and marked free disk blocks would be collected into its own free disk block list and the corresponding bit "flipped" to zero. In the case where a system would exceed the bounds of its free disk block array and it has to free another disk block; then the bitmap would be modified to indicate the respective disk blocks are "free" (set to 1) after removing the disk block(s) from its own free list.

To minimize contention for the same portion of the disk block bitmap, the value returned when acquiring the free disk block resource lock will indicate which portion of the free disk block bit map to use next. Refer to the DLM free disk block resource section for more detail.

The online recovery mechanism will not be responsible for auditing and restoring lost free disk blocks to the bitmap. The off-line full fsck facility will return all free disk blocks to the free disk block bitmap and thus handle correcting the filesystem for lost free disk blocks.

The size of the free disk block bit map will be determined by the number of disk blocks in the file system (controlled by parameters to mkfs). The number of logical blocks used for the bit map is the rounded up value of (#_of_disk blocks)/(size_of_logical_block_in_bytes*8)

In the situation that a system attempts to get free disk blocks by scanning the entire free block bitmap as described and finds no free disk blocks, then a request must be made to have all other active cluster systems release any free blocks they have back to the free disk block bitmap. The mechanism to alert other nodes that they are to remove their known free blocks from their individual free block lists (s_free) and to set the appropriate bits in the bit map is via the system attempting to get free blocks requesting the release free blocks resource in exclusive mode. All nodes normally hold the release free blocks resource in protected-read mode; and would be notified that a node wishes to acquire the resource in exclusive mode. Prior to releasing the resource, each node would "give up" some of its free blocks as described. A time stamp provided as a value return for the release free blocks resource will ensure that on full exhaustion of the filesystem free disk blocks continuous thrashing would be prevented and appropriate failures would occur.

Data Blocks 311

This last portion of the filesystem layout contains data which may be the actual file contents, such as a normal file or directory, or may be an indirect array of disk blocks.

3. External Interfaces 3.1. Distributed Lock Manager

The Distributed Lock Manager (DLM) plays a central role in the control of the CFS. It is used to coordinate access to the various parts of the file system so that the multiple nodes of the CFS all maintain a consistent view. It is also used to monitor for the presence, or absence, of other nodes so that should a node fail, another node may safely correct the damage caused by the failure.

All of this is done by creating DLM "resources" which are uniquely named for the file system and file system piece they represent, and having done this an appropriate DLM lock on the resource is acquired, effectively blocking other nodes from inappropriate access.

Heavy use is made of the DLM feature that allows a DLM user to "notify" another user where the first user desires a lock but the lock can not be achieved without the second user giving up a lock. The CFS normally acquires locks as needed but never relinquishes the locks unless someone else tells the CFS to do so. This minimizes lock activity.

3.2. Cluster Control Daemon

The Cluster Control Daemon (CCD) is a part of the Cluster Control Module (CCM) and it is used to maintain a notion of a cluster. The exact interface to the CCD is not well defined at this time but it will be basically used to:

- Provide early notification that a node may have failed. This notification will occur prior to the DLM completing lock manipulations that take place when a node fails. This will allow the CFS to prepare for file system correction activities.
- Definitively inform the CFS when a node is in a state that can no longer harm a file system. This, along with DLM lock transitions, will define when correction activities can commence.
- Provide a mechanism to automatically distribute configuration data throughout the cluster. Such CFS related data is not well defined at this time.

The CFS is not dependent upon the availability of the CCD. It will use it if available, and if not the recourse will be lower data integrity.

3.3. SCSI Cross Reference

The CFS needs to be able to uniquely identify a file system when mounting it in order to ensure that it is accessing the same data store in the same manner from all nodes; without doing so risks total file system destruction. Unfortunately the data store can not contain this unique identifier in that file systems can be easily duplicated and simultaneously mounted.

A SCSI Cross Reference must be provided to ensure that the CFS is accessing the same data store in the same manner from all nodes. A higher level entity must exist as well, in that the CFS only works well with multiple spindle storage devices (such as DAP) which can span multiple SCSI devices and format the data store in non-straightforward ways.

Assuming the presence of such control entities, the CFS will use them. If not the CFS will require a manual entry of configuration data which will be distributed throughout the cluster by the CCD.

4. Major Components

Figure 2:
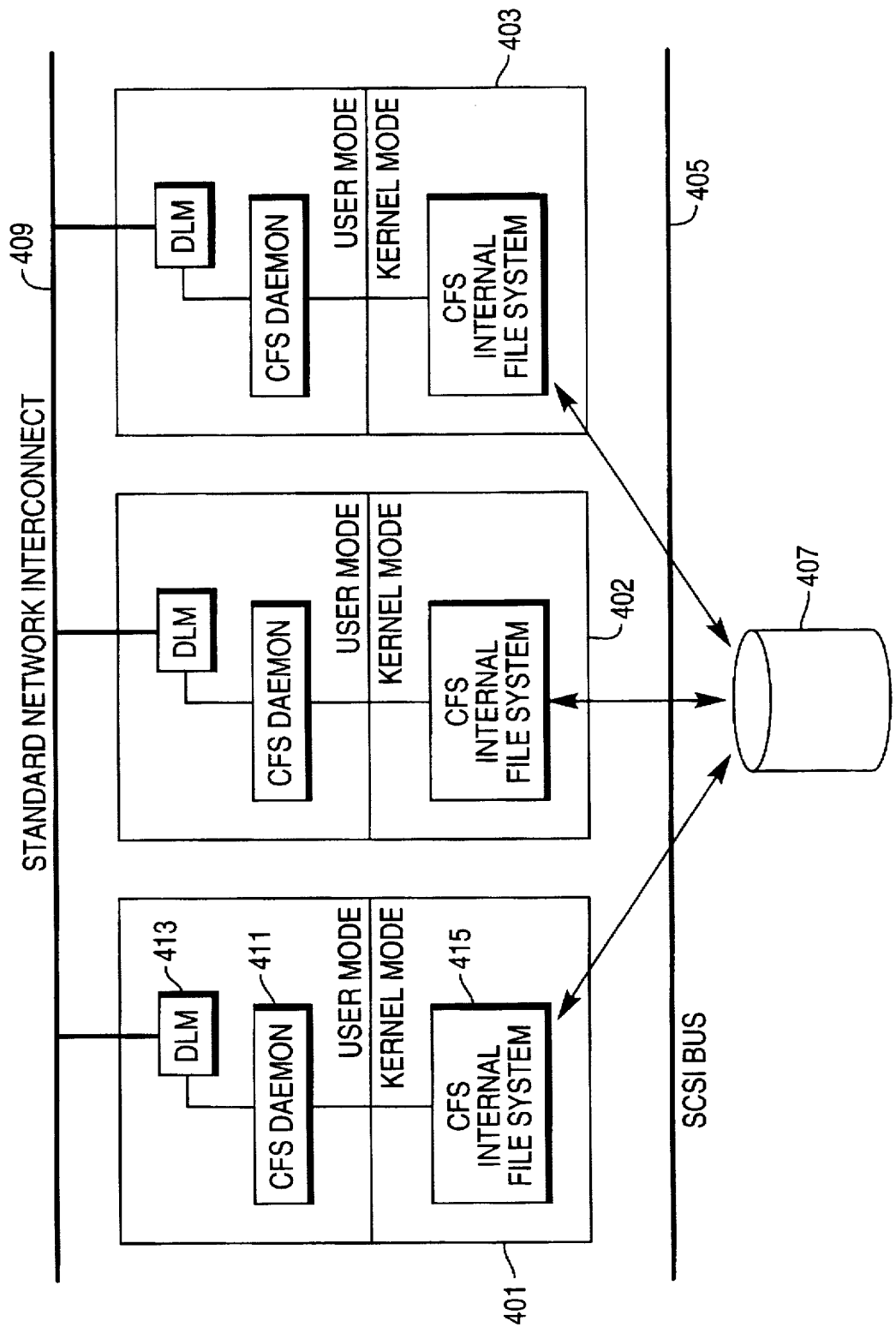
FIG. 2 is a block diagram illustrating the architectural design of a clustered file system.

The major components of the clustered file system (CFS), illustrated in FIG. 2, include two or more processing nodes 401, 402 and 403, a shared SCSI bus 405, a common data storage device 407, and a standard network interconnect 409. A Distributed Lock Manager (DLM) system coordinates access privileges while assuring data integrity. Major components of the file system contained within each processing node are described below.

4.1. DLM Interface Daemon 411

The CFS includes a daemon which interfaces with the DLM in order to acquire and manipulate DLM resources on behalf of the file system. The clustered file system daemon is hereinafter referred to as the cfsd. Although there will actually be a separate cfsd for each file system that is mounted in order to isolate DLM resources and provide better throughput; the discussion which follows will refer to the cfsd as though there is only a single one. Each cfsd performs the same functions for its separate file system in isolation from each other cfsd and associated file system.

4.1.1 Initialization

The cfsd is started as an artifact of the CFS mount command. It is in fact the entity which actually performs the mount system call for the requested file system. The cfsd is forked by the mount command and it will complete the mount and enter a service wait state, or fail the mount and report the failure reason, via pipe, back to the mount command. Initialization activity includes:

- Attaching to the DLM. Failure will result in mount failure and termination.
- Determination of the superblock to be used and validation that the superblock selected is not damaged. Failure will result in selection of an alternate superblock, or mount failure if no other superblock is selectable.
- An attempt to become the file system controlling node. Failure will simply stage the attempt so that should the current controller fail, that this node could take over this service.

If the node becomes the controlling node it will control online fsck and it will perform such activity at an appropriate time shortly after completing the local mount.

If the node becomes the controlling node it will attempt to become the overall CFS controlling node.

Upon completion of all other initialization activities the cfsd will issue a mount command and effectively register itself with the internal file system code as the sole server of DLM lock requests required to service this file system. It then drops into a wait state inside the internal file system (within an ioctl system call) awaiting requests for lock service. Such requests are either generated by other processes accessing the file system locally using normal system calls, or the DLM by way of a signal interrupt.

4.1.2. Interfaces

Distributed Lock Manager. The cfsd exists primarily to interface with the DLM. All normal DLM lock traffic will take place using the cfsd as the placeholder owner of the locks in lieu of the real owner (the internal file system). By and large the cfsd simply reacts to requests from either the internal file system or the DLM by simply passing the requests through to the other. It is a fancy pipeline with little intelligence of its own.

The cfsd cannot correctly function without the DLM. It will not start unless the DLM is present and should the DLM terminate, the cfsd will pass this on to the internal file system and then terminate as well.

Cluster Control Daemon (CCD). The cfsd must also interface with the CCD. Basically the CCD interface will tell the CFS when a node has left the DLM quorum and when that node has indeed reached a benign processing state. Upon reaching this known state the file system controller node instance of the cfsd will initiate any online fsck activity that is necessary.

On a node which is leaving the quorum, the CCD will inform the CFS to unmount the file system as soon as possible in order to minimize or eliminate file system damage.

Internal File System. The Internal file system is a standard SVR 4.0 MP-RAS based file system which interfaces to the cfsd using two specific system calls:

- The mount system call constructs the necessary data structures required to support file system service for a specific file system instance. It also registers the cfsd as the sole control point for DLM lock traffic concerned with the specific file system.
- The ioctl system call is used for all post-mount communication between the daemon and in internal file system. A multiplexed 2-way interface will be used to allow each transition into and out of the internal file system to pass a large number of new requests or responses. When no outstanding work exists for the daemon it will be sleeping inside the file system code in the ioctl routine. It can be awakened by new work arriving from either the file system or from the DLM, e.g., work from another node.

Online fsck Daemon. The controlling node will from time to time find it necessary to instigate the execution of an on-line fsck based on either the failure of another node or the corruption of a currently unused superblock. It will not perform this work itself but rather it will fork and execute another process, the online fsck daemon, which will actually drive the correction of the possible file system damage.

Special Signal Handling. Miscellaneous signal handling devices will be employed for special activities within the cfsd. While this is not well defined at this time they will include early node failure notification from the CCD and generation of performance monitoring metrics.

4.2. Internal File System 415

4.2.1. Interfaces

DLM Interface Daemon (cfsd). The coordination of the file system amongst the cluster of systems is performed through the use of DLM locks. As part of all internal file system operations which act upon the common file system image, requests will be made to acquire and manipulate DLM resources. As the actual DLM interface is at user level, the DLM interface daemon provides the conduit by which the internal file system makes requests and receives responses to and from the DLM. The internal file system and the cfsd daemon(s) interface through the CFS ioctl() routine.

For the purposes of improved throughput in systems having multiple cluster file system instances mounted, a separate cfsd daemon process will handle each file system. The internal file system will keep track of which daemon handles which file system, and pass requests and receive responses appropriately. The association of a particular cfsd to a file system is established via the mount sequence; the internal file system will record the particular cfsd handler details (e.g. process number) for subsequent use.

The CFS ioctl() routine will handle several types of requests from a cfsd process.

CFS_CMD_WAITREQ, CFS_CMD_NOWAITREQ

This is the primary ioctl() request for communicating DLM CMD requests and responses. The mechanism is that the daemon supplies a pointer to a user level data structure which can be filled in by the internal file system code with DLM resource requests. In addition, DLM responses and notification data is provided from the daemon to the file system through this data structure. When no outstanding file system actions require DLM resource requests be passed to the cfsd process, the cfsd process will normally be placed in a sleep() in the ioctl handling routine. The cfsd handler will awakened by either file system activities requiring DLM resource manipulation or via signals from the DLM environment against the cfsd process, e.g., work from another node and DLM responses. When the cfsd process has additional outstanding work (responses) for the file system which it expects to pass down after a current ioctl request, the ioctl command argument used would be CFS_CMD_NOWAITREQ; indicating that no sleep should be performed by the ioctl functions. The data structure used for passing cmds and responses between cfsd and the filesystem is currently defined to pass 10 DLM requests & 10 responses.

CFS_CMD_SHUTDOWN

This request will be passed to the internal file system in the event that the DLM environment fails or other cfsd activity determines any fatal errors dictate that the file system access be immediately shutdown. The result of this request should be that all DLM resource information held by the file system be destroyed and all users be notified via errors returned on all outstanding requests.

CFS_CMD_SETTIME

This command used for the coordination of time stamps applied to files in a manner that is consistent both across nodes as well as file systems. This may eventually be done by some non-CFS specific entity which coordinates system clocks. Until such time as such a facility exists, the CFS overall coordinator will pass a time stamp value throughout the cluster through lock values between cfsd instances, cfsd processes will pass this value to the file system via this ioctl command as its argument. The file system will retain the difference between its system time and the time stamp for purposes of providing times in the cluster file system related functions.

Several other cfsd utilized commands may exist for special operational tuning, performance metrics and debugging access for the file system.

UNIX Virtual File System (VFS) The cluster file system will function and interoperate fully within the UNIX SVR4 Virtual File System (VFS) environment. The overall requirement and design guideline is that all the necessary functions for vnops and vfsops capabilities will be provided. The fundamental data element interfaced between general file system functions in UNIX OS and the CFS code will be the vnode. The vnode data structure will be held with in the CFS incore inode structure. Translation between a vnode pointer and the incore inode pointer for any CFS file operations will be therefore straightforward.

4.2.2. Inode Control

Access to inodes must be protected within several aspects of parallelism in this file system. First inodes must be "locked" within a system so that different user processes can access the same inodes (files) in "critical sections", without unintended collision, this will be ensured through the use of a internal system lock on each incore inode (using i_flag ILOCKED bit). To ensure proper operation within SMP configurations multiprocessor locks are used (using VFS vnode VNL_LOCK). The final protection is for users on different systems accessing the same inodes (files), for this case DLM resources will be used.

Whenever the file system creates an incore inode, a request will be made to the CFS DLM interface daemon cfsd to create a DLM inode access resource. The file system code will request and acquire a lock level of protected-read whenever examination of the inode or its data blocks is required. When the file system code is going to modify any inode information or its data blocks it must acquire the inode access resource in exclusive mode, the only exception is for an access time adjustment.

An inode access resource is maintained so long as the incore inode exists and its lock is maintained at the highest level requested so long as possible.

In addition to the inode access resource manipulation, a second DLM resource for each created incore inode will be acquired to track references to a inode (the DLM inode reference resource). The inode reference lock is opened and initially acquired in tandem with the opening and acquisition of the inode access lock. The inode reference lock is maintained for the life of the internal inode at protected-read level. In particular when an inode is placed on the free list (its local reference count is 0) the inode reference lock will be guaranteed to be at least at protected-read level. This will ensure that the processing node will be assured of being notified whenever another node attempts to acquire the lock at exclusive level.

When the condition arises that the inode link count becomes 0 (the file has been unlinked) and the local reference count becomes 0 the following combination of lock activity will occur:

The inode access lock will be acquired in exclusive mode.

The inode reference lock will be have a no-queue attempt to acquire the exclusive mode. A no-queue request to the DLM will fail if another node holds the inode reference lock in protected-read mode. In this case this processing node can be assured that another node holds an interest in the inode and will at some time in the future go through a similar flow of activity on the inode. This node can simply proceed with a total teardown of the internal inode and close both locks.

If the node acquires the inode reference lock in exclusive then the implication is that this is the last processing node to hold an interest in the inode and therefore can proceed with the traditional truncation and removal of the file.

For the purposes of potential recovery from system failures, a record of modified inodes will be kept within the Modified Inode Journal bit map which exists for each cluster member system (associated with the specific superblock used by a node). An individual Modified Inode Journal bitmap will provide indication to the on-line recovery function that particular inodes may have been modified by the respective system prior to a system failure (and thus may be damaged). A bit representing a specific inode is set (=1) whenever an in-core inode is created and an exclusive inode lock is acquired prior to any modification. The bit is cleared whenever an inode lock is closed (and the bit had previously been set).

4.2.3. File Data Blocks (use of Inode Space)

As discussed previously the layout of the file system will support storage of some file data directly in the inode block.

Several design options exist for the use of the inode block space for data.

Option 1: First x bytes of file stored in inode

The file system will store the first 1024 (or 512 or ??) bytes of a file in the inode block. Thus anytime access is made to the first data of a file it would be from the inode block; and then from the data blocks listed in the inode data structure direct and indirect logical block address information. This would imply that for small files, all the file data would be stored in the inode block.

Option 2: Last χ bytes of file stored in inode

The file system will store data in the inode block whenever the remainder of a file after filling 2048 byte logical blocks fits. Specifically: Inode block holds data when (di_size modulo 2048 )<=1024. ((di_size & 0x400)==0) && (di_size & 0x3ff) This implies that file system functions related to the writing and/or appending to a file must handle relocating data when the file grows beyond the 1024 remainder condition.

Option 3: Use inode block space for only small files (all data in inode block)

If the file size [di_size] is less than some value, e.g., 1024 or 512, all of the file data is stored in the inode block. Like option 2, this would imply copying data from the inode block to a normal data block as the file grew beyond the specific size; also if the file shrank [truncated] a similar copy might have to be made back to the inode block.

An alternate version of this option might be to only store data in the inode block until the file size grew, and then for ever after use data blocks, even if the file became small enough to again fit in the inode block. Some status bit in the inode structure would then have to indicate if the inode contains the data or a data block.

4.2.4. Free Inode Control

Each system maintains its own individual and unique list of free inodes within the filesystem superblock data structure array s_inode. This array provides up to CFSNICINOD free inode indexes. When a free inode must be allocated for some file activity such as creating a new file, this array would be manipulated, removing a free inode from the list. The value of s_ninode indicates the next free inode to be removed and also provides the total present number of free inodes in the s_inode array. Whenever an inode is freed, the inode would be added to the s_inode array, if array space is available. Whenever the local free inode array is exhausted or becomes filled to its maximum, then it will be necessary to manipulate the "shared" free inode bitmap for the cluster file system. A set of DLM resource locks will be used to ensure integrity in the shared bit map.

Using the resource locks the bitmap would be scanned by a system needing free inodes and marked free inodes would be collected into its own free inode list and the corresponding bit "flipped" to zero. In the case where a system would exceed the bounds of its free inode array and it has to free another inode; then the bitmap would be modified to indicate the respective inodes are "free" (set to 1) after removing the inode from its own free list.

This use of the bitmap eliminates the need to scan through the inodes themselves to find free ones; improving performance by having less contention and disk I/O during inode allocations.

To additionally assist in reducing contention for the same portion of the inode bitmap, the value from the free inode resource lock will indicate which portion of the free inode bit map to use next. Refer to the DLM free inode resource section for more detail.

4.2.5. Free Block Control

Each system maintains its own individual and unique list of free blocks within the filesystem data structure array s_free. This array provides up to CFSNICFREE free block logical addresses. In addition, chains of free blocks are possible, in that the zero element of each array can point to yet another array list. When a free block must be allocated for some file activity such as appending to a file, this array would be manipulated, removing a free logical block address from the list. The value of s_nfree indicates the next free block array element to be removed and also provides the total present number of free blocks in the s_free array. Whenever an block is freed, the block's logical address would be added to the s_free array, if array space is available. Whenever the local free block array is exhausted and s_free[0] is non-zero then the value of s_free[0] is used as a logical block address of a new free block list to fill s_free[]. If the free block array is exhausted and s_free[0] is zero then it will be necessary to use the "shared" free block bitmap for the cluster file system. A set of DLM resource locks will be used to ensure integrity in the shared bit map.

Using the resource locks the bitmap would be scanned by a system needing free blocks and marked free blocks would be collected into its own free inode list and the corresponding bit "flipped" to zero. Blocks would be placed on the s_free[] array so that when later allocated for regular files they would be ordered properly for best performance, e.g., increasing and contiguous if possible. The amount of free blocks taken from the free bit map on any given attempt would be 512. If as a result of scanning the bitmap of free blocks, less than 50 free blocks are found, then a "request"

will be made to other nodes to "give up" their free blocks back on to the free block bitmap. This "give up free block" request is performed via the system needing free blocks requesting a conversion of the "release free block" DLM resource from protected-read to exclusive lock level; all other nodes hold the resource at protected-read level and would receive notification that another node needs the resource. At this notification, each system would release all of their free blocks to the free block bit map and cycle the release free block resource lock level to NULL and back to protected-read. To ensure that thrashing of this lock will not occur when the file system has truly reached exhaustion, a common time stamp, such as passed in the clock resource value block, is stored in the "release free blocks" resource value block upon dropping the exclusive lock.

When a system frees blocks in the normal course of internal file system activity, such as the result of truncating a file, the free blocks are chained on its own individual free block list. The only time free blocks are returned to the "shared" free block bit map is by the lock request described in the previous release conditions.

To assist in reducing contention for the same portion of the free block bitmap, the value from the free block resource lock will indicate which portion of the free block bit map to use next.

4.3. Failure Recovery

There are many types of failure conditions possible and each must have its own recovery strategy. The following subsections define the anticipated failure scenarios and the basic strategies to be employed for each.

4.3.1. Daemon Failure

The cfsd is the real owner for all of the DLM locks which are used to control its associated file system. This daemon is expected to be extremely robust, however it is still susceptible to failure; and failure implies loss of all DLM locks.

The internal file system will monitor for the continued presence of the cfsd and should it disappear while the file system is still mounted, the internal file system will summarily reset all DLM lock control information it has to a state that will prevent further file system activity, and unmount the file system without further disk activity, including any update to the superblock; it will thus be left in a corrupted state.

The associated cfsd on each other node will see the DLM locks transition to them, assuming outstanding requests existed. The transition of these locks will contain dubious value-blocks and the cfsd will hold the locks at user level and not pass them on the internal file system. The cfsd processes will relinquish the locks upon demand.

The controlling node, by virtue of acquiring the failed node superblock lock, will examine the superblock, find it corrupt and initiate a online-fsck.

The online-fsck will load the modified inode journal and repair each marked inode by acquiring the inode lock. This lock may or may not be held by another node but in any case contains a dubious value block. The online-fsck will post a valid value block into it allowing any stalled cfsd to reacquire the lock and pass it on to the internal file system.

The online-fsck will repair files and throw away all superblock controlled free blocks and inodes. Because reference block counters are not checked, there exists the possibility for the introduction of unlinked files. All of these are expendable. They can be recovered at the next offline-fsck which will examine and totally correct the file system.

Returning the node where the daemon failed would require that user processes associated with the old mount be either terminated or left in a permanently disabled state. This is because the controlling node will have executed an online-fsck which may have profoundly altered the structure of the files which had been in use on the node where the failure occurred.

4.3.2. Node Failure When a Node Has Failed

Node failure is first determined by the DLM which stops all lock traffic and attempts to form a new cluster quorum. Much of the flow is similar to the situation described above.

The file system will be basically unaware that failure has occurred and will continue service as described above. This service will be hampered by the fact that for a period of time no lock transitions will be possible. Even when locks are again possible at least a subset of lock transitions will not be possible, until the controlling node of the file system has had a chance to correct the damage caused by the failed node. However, any work that can go forward because the appropriate level locks pre-existed will be allowed.

The controlling node will interface with a SCSI target mode facility which will guarantee the failed node is in a "safe" state, i.e., no file system activity could be occurring.

The controlling node cfsd will then spawn a new process, online-fsck which will drive correction of the file system by acquiring the appropriate locks and then interfacing with the file system through a special ioctl interface which is used to examine and correct files.

4.3.3. Node Failure When a Node Not Responding

Again the DLM will see this state and report it to the CCD and on to the cfsd processes. In this case, on the non-responding node, the cfsd will interface with the internal file system and report a DLM failure. The file system will respond by effectively unmounting the file system. The cfsd will use the CCD to report via SCSI target mode that it has arrived at a "safe" state.

Throughout the rest of the cluster the activity is similar to what has been described earlier.

4.3.4. DLM Failure

The node where the DLM has failed will be seen by both the CCD and the cfsd as a DLM disconnect. Subsequent activity is similar to the preceding case.

4.3.5. CCD Failure

Failure of the CCD will not have any impact on the internal file system. It is expected that should the CCD fail, it will restart and re-establish communication with the DLM and cfsd processes. Should the CCD not be present, the cfsd processes will react by assuming the "safest" state is present. That is to say, the CCD would have told the cfsd that another node was or was not in a "safe" state for the controlling node to commence online-fsck.

4.4. Online fsck Daemon

The online fsck daemon, hereafter referred to as online_fsck, is a process which is started directly by the cfsd on the controlling node of the file system whenever a superblock lock is acquired in protected read mode and it can be ascertained that:

The superblock is corrupted.

No other node is still using the superblock without being attached to the DLM. Until such time as this facility is provided it will be assumed to be not possible.

The cfsd will fork and exec the online_fsck passing it a -o parameter with the following comma separated sub parameters:

superb=<ss> where <ss> is the number of the superblock found to be corrupt.

special=<filename> where <filename> is the special device file that holds the file system.

debug=<lvl> where <lvl> is the debugging level of the cfsd process.

4.4.1. Interfaces cfsd. The online-fsck is started by the cfsd on the controlling node. It communicates with any and all cfsd processes in the cluster by acquiring and releasing locks.

DLM. The online-fsck process uses the DLM to acquire the rights to modify those resources of the file system required to correct the file system.

Internal File System. The internal file system is serially informed of each file which needs to be corrected.

Offline fsck. The online-fsck leaves some residual information for the eventual execution of an offline fsck.

4.4.2. Basic Execution

Upon startup the following activities are performed in the following order:

1. The DLM resource controlling the superblock to be checked is acquired at exclusive level. At startup the cfsd process holds this at protect-read level. This will cause the cfsd to relinquish the lock in exactly the same way that the startup of a node that wished to use the superblock would appear.

2. The corresponding superblock is read into memory from the disk. It is verified to be a superblock.

3. If the superblock is not verified either superblock 0 (or superblock 1 is 0 is being checked) and is verified. If verified the superblock to be checked is rebuilt using this one.

4. The superblock to be checked is verified as being corrupted. If not then the process terminates.

5. The modified inode journal associated with this superblock is read into memory from the disk. It is scanned for potentially damaged inodes.

6. For each inode a DLM lock is acquired at exclusive level. Because the various cfsd processes may not have yet relinquished all inode locks, the acquisition of each inode lock is not guaranteed. Therefore no attempt is made to do have every lock prior to fixing; just an attempt to acquire as many as possible.

7. Each inode for which a lock was acquired is passed, one by one, into the internal file system for correction. Correction may or not result in a change to the file. As each is completed the associated DLM lock is released with a valid value block, closed, and the modification journal is cleared.

8. Upon completion of all inodes for which locks were originally acquired, a second attempt is made to acquire those which were not obtained the first time. Any that are acquired now will result in a repeat of the process.

9. Upon completion of both passes the modified inode journal is written back to the disk and if all inodes were corrected then the superblock is marked as correct, the free inode and free block lists are cleared and it is written back to the disk. If the superblock does not get written then this will result in the controlling cfsd again invoking the online-fsck in a short period of time.

10. A count of the number of times a superblock is updated by the online-fsck is maintained in the superblock. This provides an indication to some subsequent offline fsck information as to the likelihood of finding lost resources.

4.5. Offline fsck

A CFS file system contains multiple superblocks where any given cluster node can mount the CFS if any superblock can be found to be not-corrupted. Having found one and having mounted the file system, the node (or another) will automatically correct the remaining corrupted superblocks. The offline-fsck facility allows for correction when the file system is unmounted. A natural question then is "why is it needed". Following are some of the reasons why an offline-fsck facility is needed:

The entire cluster may have failed resulting in all superblocks being marked as corrupted.

The online-fsck corrects damage but does not concern itself with lost resources. The offline-fsck will restore lost resources.

The offline-fsck is runnable even without the DLM or any networking support.

4.5.1. Recovering Lost Resources

The online-fsck is intended to run fast and efficiently to correct damage and minimize interference with users. As a result it was designed to repair damage and intentionally loose the following resources:

- free inodes from the superblock—this is the entire free inode list associated with the superblock and could be as many as CFSNICINOD free inodes.

- free blocks from the superblock—this is the entire free block chain associated with this superblock. It might represent thousands of available data blocks.

- unlinked inodes—a failed node may have been the last node to have been using an unlinked inode. If a node fails while still using an unlinked inode, it will leave behind this file resource which could represent a significant portion of free space.

The offline-fsck program will search for such lost resources and restore them to service.

4.5.2. Returning Free Resources to a Common Pool

The multiplicity of superblocks and the design of minimizing DLM lock contention results in sub pooling available file system resources in a manner that allows a individual node to unilaterally control its own subpool. The CFS will periodically attempt to return excess resources to the common pool. The offline-fsck will do so as well, returning all free resources to the common pool.

4.5.3. Normal Correction

Even though the online-fsck should have corrected file system damage, the offline-fsck will check for damage by scanning the entire file system. Even if online-fsck performs its job correctly the fact remains that all superblocks could have been corrupted by an entire cluster failure.

It can thus be seen that there has been provided by the present invention a new and useful method for identifying and repairing file system damage following a processing node failure within a clustered UNIX file system. Although the presently preferred embodiment of the invention has been described, it will be understood that various changes may be made within the scope of the appended claims.

What is claimed is:

1. A method for repairing file system damage following the failure of a processing node within a clustered file system, said clustered file system including a plurality of processing nodes, an interconnection network connecting said processing nodes, and a data storage device connected via a shared interconnect with each one of said plurality of processing nodes, said file system employing data structures known as inodes, each inode defining a space within said file system which is reserved for a file, access by said processing nodes to a file within said file system being controlled through acquisition of an exclusive rights to the inode associated with said file, said method comprising the steps of:

maintaining a journal for each processing node, each one of said journals containing a bit map wherein bits within said bit map represent inodes to which the processing node associated with said one of said journals has acquired and retains an exclusive right, said bit map being updated whenever its associated processing node acquires an exclusive right to an inode;

following a failure of one of said processing nodes, reading the bit map journal associated with the failed processing node and acquiring the exclusive right to every inode found within the bit map journal associated with the failed processing node, referred to herein as suspect inodes;

comparing each suspect inode to a global bit map which identifies each and every unit of space within the file system that is assignable, a suspect node being identified as having a transient state when the unit of space assigned to the suspect inode is found to be assignable; and removing the assignment of a unit of space to any suspect inode identified as having a transient state.

2. The method in accordance with claim 1, further comprising the steps of:

comparing each suspect inode with each of the remaining suspect nodes within the bit map journal associated with the failed processing node to determine if the same unit of space is assigned to more than one suspect inode; and removing the assignment of a unit of space to each suspect inode to which a the unit of space is multiply assigned.

3. The method in accordance with claim 1, further comprising the step of:

upon completion of the audit of a suspect inode, the exclusive right to the suspect node is relinquished allowing the right to transition normally to another processing node.

4. The method in accordance with claim 1, further comprising the step of:

designating a non-failed processing node for performing said steps of reading the bit map journal associated with the failed processing node; comparing each suspect inode to a global bit map; and removing the assignment of a unit of space to any inode identified as having a transient state.

5. The method in accordance with claim 4, further comprising the step of:

designating a second non-failed processing node for performing said steps of reading the bit map journal associated with the failed processing node; comparing each suspect inode to a global bit map; and removing the assignment of a unit of space to any inode identified as having a transient state upon the failure of said first non-failed processing node.

6. The method in accordance with claim 1, wherein said method is applied to correct file system damage resulting from the failure of more than one processing nodes.

* * * * *